Patented Aug. 25, 1925.                                               1,550,746

UNITED STATES PATENT OFFICE.

ELOI RICARD, OF MELLE, FRANCE, ASSIGNOR, BY MESNE ASSIGNMENTS, TO COMMERCIAL SOLVENTS CORPORATION, OF BALTIMORE, MARYLAND.

MANUFACTURE OF ACETONE AND BUTYL ALCOHOL BY FERMENTATION.

No Drawing.          Application filed July 22, 1921.    Serial No. 486,839.

*To all whom it may concern:*

Be it known that I, ELOI RICARD, a citizen of the Republic of France, residing in Melle, Deux-Sevres, France, have invented an Improvement in the Manufacture of Acetone and Butyl Alcohol by Fermentation, of which the following is a specification.

In the manufacture of acetone and butyl alcohol as described in United States Patent No. 1,385,888 granted July 26, 1921, the material is boiled under pressure, diluted to a suitable concentration, sterilized and aseptically chilled. The wort thus obtained is seeded either with a flask culture or with a certain quantity of fermenting wort, withdrawn aseptically from a previous vat.

In this method the volume of wort to be fermented is always very large relatively to the volume of ferment used in seeding it.

By the present invention the proportions are reversed, that is to say a large volume of the ferment is used and there is added to it a very small volume of wort to be fermented; under these conditions not only does the wort ferment very rapidly, but the fermentation remains pure, notwithstanding that the added wort may not be aseptic.

Thus if to 450 hectolitres of wort aseptically prepared and in the act of fermenting there are added 30 hectolitres of non-aseptic wort, the latter enters into fermentation very rapidly and it will be found that after an hour the total volume of 480 hectolitres is at the same stage of fermentation as the fermenting wort was before the admixture. If 30 hectolitres of wort be removed (the fermentation of which may be completed of itself in another vessel in the course of some hours) there is finally obtained a fermenting wort amounting to 450 hectolitres and identical with that with which one originally started.

If there now be added another 30 hectolitres of nonaseptic wort to this fermenting wort, then after an hour the whole will be at the same stage of fermentation as before the admixture, and by removing 30 hectolitres of the wort as before one again obtains 450 hectolitres of fermenting wort identical with that with which one started.

In this manner 50 to 60 successive additions of 30 hectolitres may be made without affecting the purity and the activity of the fermentation, so that the original 450 hectolitres of fermenting wort will have brought into fermentation 1,500–1,800 hectolitres of non-aseptic wort. Otherwise stated, an aseptic fermenting wort can bring about the fermentation of 3 or 4 times its volume of non-aseptic wort if this be added in successive portions and may be caused to ferment a volume equal to its own in the course of 18 to 20 hours.

It has been stated in the aforesaid United States Patent No. 1,385,888 that a volume of 450 hectolitres of wort ferments in 24–26 hours, starting from the moment when it is seeded with a ferment withdrawn from a preceding vat. The method described above, therefore, produces a gain of 25 per cent on the duration of the fermentation. This acceleration of the fermentation conduces to a high degree of certainty in the manufacture and a decided increase in the output.

On the other hand, according to said United States Patent No. 1,385,888 the mash is boiled to a concentration of 15–16 per cent and diluted at the exit of the boiler with water heated so as to obtain finally a wort having the temperature of sterilization. If, for the purpose of economizing steam, the mash were boiled to a higher concentration satisfactory results would not be obtained, for it would then be necessary to dilute with a large volume of water to produce the final concentration of 8 per cent and consequently the mixture would not have finally the temperature of sterilization, so that the apparent economy of steam during the boiling would be neutralized by the amount of steam necessary for the final sterilization. There is thus a certain expenditure of steam which is irreducible.

The method of the present invention which allows the fermentation of a volume of non-aseptic wort equal to 3 or 4 times the volume of the aseptic ferment used, permits preparation of the non-aseptic wort by boiling the mash to a concentration of 30 per cent and then diluting it with cold water to bring it to the suitable concentration, namely 8 per cent. There is thus an economy of coal amounting to 40 to 50 per cent in this phase of the manufacture. The economy is much greater in comparison with other processes of making acetone and butyl alcohol by fermentation in which the mash is boiled directly to the concentration 5–7 per cent.

Finally if, instead of using a grain mash (or amylaceous material in general) saccharine liquids are used, it is no longer useful to boil under pressure.

The boiling of amylaceous material has for its object the disintegration of the agglomerated starch cells and their infinite subdivision in order that they may all be subjected to the contact of the bacterial diastases which are to transform them. In the case of worts containing dissolved sugars, this object of boiling does not exist.

Thus, if the non-aseptic wort to be fermented is composed, for example, of beet juice, sugar cane juice, molasses, saccharine materials containing saccharose and glucose, milk serum containing lactose (milk serum is the residual liquid remaining after extracting fatty matter and casein from milk), saccharine wort containing glucose and produced by the saccharification of celluloses by the process of Terrisse and Lévy (French specification No. 511,924) or other processes of like nature, there is no necessity to boil. These various worts or saccharine juices used as such without heating may be diluted with cold water to the concentration 8 per cent. In this case there is an economy of 100 per cent of heat in this phase of the process.

The most favorable moment for using the aseptically prepared wort as a ferment to bring about the fermentation of non-aseptic wort is that which corresponds to the stage of the fermentation where 70–80 per cent of the carbohydrates have been transformed into butylacetonic products.

The present invention has been explained in its application to the process described in said United States Patent No. 1,385,888 which uses the bacillus butylicus B. F., but it may be remarked that it is equally adapted to all other processes of butylacetonic fermentation using other bacteria.

Having thus described the nature of the said invention and the best means I know of carrying same into practical effect, I claim:—

1. An improved process for the manufacture of acetone and butyl alcohol by the fermentation of amylaceous material, which consists in producing non-aseptic worts, and in adding the wort thus obtained in succession and in small quantities to a fermenting aseptic wort having a considerable volume compared with the quantities of non-aseptic wort added, whereby as compared with the usual processes of fermentation, the manufacture can be carried out by economizing the whole of the steam which would be necessary for making the wort aseptic.

2. An improved process for the manufacture of acetone and butyl alcohol by the fermentation of amylaceous material, which consists in producing non-aseptic worts by boiling the amylaceous material at a high degree of concentration, in diluting said material with cold non-sterilized water and in adding the wort thus obtained in succession and in small quantities to a fermenting aseptic wort having a considerable volume compared with the quantities of non-aseptic wort added, whereby as compared with the usual processes of fermentation of aseptic worts, the manufacture can be carried out by economizing the whole of the steam which would be necessary for making the wort aseptic.

3. In the process of fermenting carbohydrate materials with bacteria capable of producing acetone and butyl alcohol, the step which consists in adding to an aseptic fermenting wort a relatively small quantity of a non-aseptic wort to be fermented therewith.

4. In the process of fermenting carbohydrate materials with bacteria capable of producing acetone and butyl alcohol, the step which consists in adding to an aseptic fermenting wort a relatively small quantity, substantially one-fifteenth by volume, of a non-aseptic wort to be fermented therewith.

5. In the process of fermenting carbohydrate materials with bacteria capable of producing acetone and butyl alcohol, the step which consists in adding to an aseptic fermenting wort a relatively small quantity, not exceeding one-fifteenth by volume, of a non-aseptic wort to be fermented therewith.

6. The process of fermenting carbohydrate materials to produce acetone and butyl alcohol which consists in successively adding to an aseptic fermenting wort relatively small quantities of a non-aseptic wort to be thereafter fermented therewith.

7. The process of fermenting carbohydrate materials to produce acetone and butyl alcohol which consists in successively adding to an aseptic fermenting wort relatively small quantities, substantially one-fifteenth by volume, of a non-aseptic wort to be thereafter fermented therewith.

8. The process of fermenting carbohydrate materials to produce acetone and butyl alcohol which consists in successively adding to an aseptic fermenting wort relatively small quantities, not exceeding one-fifteenth by volume, of a non-aseptic wort to be thereafter fermented therewith.

9. The process of fermenting amylaceous materials to produce acetone and butyl alcohol which consists in forming a non-aseptic wort of amylaceous materials by boiling same to a concentration not to exceed 30% of the mass, then diluting same, and finally adding a relatively small quantity of such diluted wort to an aseptic fermenting wort formed of amylaceous materials to be fermented therewith.

10. The process of fermenting amylaceous materials to produce acetone and butyl alcohol which consists in forming a non-aseptic wort of amylaceous materials by boiling same to a concentration not to exceed 30% of the mass, then diluting same with cold water, and finally adding a relatively small quantity of such diluted wort to an aseptic fermenting wort formed of amylaceous materials to be fermented therewith.

11. The process of fermenting amylaceous materials to produce acetone and butyl alcohol which consists in forming a non-aseptic wort of amylaceous materials by boiling same to a concentration not to exceed 30% of the mass, then diluting same with cold water, and finally adding a relatively small quantity substantially one-fifteenth by volume, of such diluted wort to an aseptic fermenting wort formed of amylaceous materials to be fermented therewith.

12. The process of fermenting amylaceous materials to produce acetone and butyl alcohol which consists in forming a non-aseptic wort of amylaceous materials by boiling same to a concentration not to exceed 30% of the mass, then diluting same with cold water, and finally adding a relatively small quantity not exceeding one-fifteenth by volume, of such diluted wort to an aseptic fermenting wort formed of amylaceous materials to be fermented therewith.

13. The process of fermenting amylaceous materials to produce acetone and butyl alcohol which consists in forming a non-aseptic wort of amylaceous materials by boiling same to a concentration not to exceed 30% of the mass, then diluting same, and finally adding a relatively small quantity of such diluted wort successively to an aseptic fermenting wort formed of amylaceous materials to be fermented therewith.

14. The process of fermenting amylaceous materials to produce acetone and butyl alcohol which consists in forming a non-aseptic wort of amylaceous materials by boiling same to a concentration not to exceed 30% of the mass, then diluting same, and finally adding a relatively small quantity of such diluted wort at successive intervals to an aseptic fermenting wort formed of amylaceous materials to be fermented therewith.

15. In the process of fermenting carbohydrate materials with bacteria capable of producing acetone and butyl alcohol, the step which consists in adding to an aseptic fermenting wort a relatively small quantity of a non-aseptic wort to be fermented therewith, said non-aseptic wort being added in such manner that the fermentation of the mass is maintained in substantially its same previous stage.

16. In the process of fermenting carbohydrate materials to produce acetone and butyl alcohol, the step which consists in passing non-aseptic wort, in small quantities at successive intervals, into a large mass of fermenting wort by which fermentation is initiated in said small quantities.

17. The process of fermenting carbohydrate materials to produce acetone and butyl alcohol which comprises forming a non-aseptic wort of carbo-hydrate materials by boiling same to a concentration not to exceed 30% of the mass, then diluting the same, and adding a relatively small quantity of such diluted wort to an aseptic fermenting carbohydrate wort to be fermented therewith.

18. The process of fermenting carbohydrate materials to produce acetone and butyl alcohol which comprises forming a non-aseptic wort of amylaceous materials by boiling same to a concentration not to exceed 30% of the mass, then diluting the same, and adding a relatively small quantity of such diluted wort to an aseptic fermenting carbohydrate wort to be fermented therewith.

In testimony whereof I have signed this specification.

ELOI RICARD. [L. S.]